(12) United States Patent
Gregory

(10) Patent No.: US 9,869,552 B2
(45) Date of Patent: Jan. 16, 2018

(54) GYROSCOPE THAT COMPENSATES FOR FLUCTUATIONS IN SENSITIVITY

(71) Applicant: Analog Devices, Inc., Norwood, MA (US)

(72) Inventor: Jeffrey A. Gregory, Malden, MA (US)

(73) Assignee: Analog Devices, Inc., Norwood, MA (US)

( * ) Notice: Subject to any disclaimer, the term of this patent is extended or adjusted under 35 U.S.C. 154(b) by 188 days.

(21) Appl. No.: 14/664,034

(22) Filed: Mar. 20, 2015

(65) Prior Publication Data

US 2017/0023364 A1 Jan. 26, 2017

(51) Int. Cl.
| | |
|---|---|
| *G01C 19/56* | (2012.01) |
| *G01C 19/5776* | (2012.01) |
| *G01P 15/125* | (2006.01) |
| *G01P 15/13* | (2006.01) |
| *G01P 21/00* | (2006.01) |
| G01C 19/5649 | (2012.01) |
| G01C 19/5607 | (2012.01) |

(Continued)

(52) U.S. Cl.
CPC ........ *G01C 19/5776* (2013.01); *G01P 15/125* (2013.01); *G01P 15/13* (2013.01); *G01P 21/00* (2013.01); *G01C 19/56* (2013.01); *G01C 19/5607* (2013.01); *G01C 19/5642* (2013.01); *G01C 19/5649* (2013.01); *G01C 19/5719* (2013.01)

(58) Field of Classification Search
CPC .................................................. G01C 19/5719
USPC ....................................................... 73/504.12
See application file for complete search history.

(56) References Cited

U.S. PATENT DOCUMENTS

| | | | | |
|---|---|---|---|---|
| 2,309,853 A | * | 2/1943 | Norden | ................. G01C 19/56 33/300 |
| 2,513,340 A | * | 7/1950 | Lyman | ............... G01C 19/5607 73/504.16 |

(Continued)

FOREIGN PATENT DOCUMENTS

| | | |
|---|---|---|
| EP | 0860685 | 8/1998 |
| EP | 1788385 | 5/2007 |

(Continued)

OTHER PUBLICATIONS

Sonmezoglu et al, An Automatic Mode-Matched MEMS Gyroscope With Wide and Tunable Bandwidth, Journal of Micromechanical Systems IEEE, vol. 23, No. 2, Apr. 2014, pp. 284-297.*

(Continued)

*Primary Examiner* — Clayton E Laballe
*Assistant Examiner* — Kevin Butler
(74) *Attorney, Agent, or Firm* — Wolf, Greenfield & Sacks, P.C.

(57) ABSTRACT

A method compensates for a sensitivity of an inertial sensor having a resonator and an accelerometer. The method includes adding a test signal to a quadrature tuning voltage applied to the resonator of the inertial sensor. The method also includes receiving a quadrature error signal from the accelerometer of the inertial sensor. The method also includes detecting a phase difference between the quadrature error signal and the test signal. The method also includes determining a bandwidth of the accelerometer based on the detected phase difference, the bandwidth indicating the sensitivity of the accelerometer.

20 Claims, 4 Drawing Sheets

(51) Int. Cl.
*G01C 19/5719* (2012.01)
*G01C 19/5642* (2012.01)

(56) References Cited

U.S. PATENT DOCUMENTS

| | | | | |
|---|---|---|---|---|
| 3,307,409 A * | 3/1967 | Newton, Jr. | G01C 19/5642 | 73/504.13 |
| 4,267,478 A * | 5/1981 | Ljung | G01C 19/665 | 310/315 |
| 4,384,409 A * | 5/1983 | Lao | G01P 3/44 | 310/313 R |
| 4,655,081 A * | 4/1987 | Burdess | G01C 19/567 | 310/329 |
| 4,755,057 A * | 7/1988 | Curby | G01C 19/665 | 356/473 |
| 4,809,589 A * | 3/1989 | Bertrand | G01L 9/0044 | 73/715 |
| 4,884,446 A * | 12/1989 | Ljung | G01C 19/5642 | 73/504.12 |
| 5,025,346 A * | 6/1991 | Tang | B81B 3/0021 | 361/283.1 |
| 5,034,905 A * | 7/1991 | Widdau | G01T 1/1642 | 324/140 D |
| 5,177,579 A * | 1/1993 | Jerman | G01L 9/0042 | 200/83 N |
| 5,275,047 A * | 1/1994 | Zabler | G01C 19/5755 | 73/504.12 |
| 5,349,855 A * | 9/1994 | Bernstein | G01C 19/5719 | 73/504.16 |
| 5,359,893 A * | 11/1994 | Dunn | G01C 19/5719 | 73/504.12 |
| 5,383,362 A * | 1/1995 | Putty | G01C 19/5691 | 73/504.01 |
| 5,392,650 A * | 2/1995 | O'Brien | G01C 19/5719 | 73/514.18 |
| 5,450,751 A * | 9/1995 | Putty | G01C 19/5684 | 73/504.18 |
| 5,589,082 A * | 12/1996 | Lin | H03H 9/02275 | 216/11 |
| 5,616,864 A * | 4/1997 | Johnson | G01C 19/5684 | 73/504.04 |
| 5,635,640 A * | 6/1997 | Geen | G01C 19/5712 | 310/309 |
| 5,650,568 A * | 7/1997 | Greiff | B81B 3/0051 | 73/504.09 |
| 5,656,778 A * | 8/1997 | Roszhart | G01C 19/5656 | 73/504.04 |
| 5,750,899 A * | 5/1998 | Hegner | G01L 19/14 | 73/706 |
| 5,767,405 A * | 6/1998 | Bernstein | G01C 19/5719 | 73/504.12 |
| 5,783,749 A * | 7/1998 | Lee | G01P 15/0802 | 73/504.12 |
| 5,869,760 A | 2/1999 | Geen | | |
| 5,915,276 A * | 6/1999 | Fell | G01C 19/5677 | 73/504.02 |
| 5,937,275 A * | 8/1999 | Munzel | G01P 15/0802 | 438/50 |
| 5,939,633 A * | 8/1999 | Judy | G01P 15/125 | 73/514.18 |
| 5,969,225 A * | 10/1999 | Kobayashi | G01C 19/5719 | 73/1.37 |
| 5,992,233 A * | 11/1999 | Clark | G01C 19/5719 | 361/280 |
| 6,032,531 A * | 3/2000 | Roszhart | G01C 19/56 | 73/504.04 |
| 6,122,961 A * | 9/2000 | Geen | G01C 19/5719 | 73/504.12 |
| 6,151,964 A * | 11/2000 | Nakajima | G01C 19/5684 | 73/504.13 |
| 6,205,838 B1 * | 3/2001 | Schmid | G01C 19/56 | 73/1.37 |
| 6,209,393 B1 * | 4/2001 | Tomikawa | G01C 19/5656 | 73/504.12 |
| 6,240,781 B1 * | 6/2001 | Namerikawa | G01C 19/5677 | 73/504.13 |
| 6,343,509 B1 * | 2/2002 | Fell | G01C 19/5677 | 73/504.13 |
| 6,370,954 B1 * | 4/2002 | Zerbini | G01P 15/097 | 73/514.01 |
| 6,401,534 B1 | 6/2002 | Fell et al. | | |
| 6,438,242 B1 * | 8/2002 | Howarth | G10K 9/121 | 181/149 |
| 6,505,511 B1 | 1/2003 | Geen et al. | | |
| 6,553,833 B1 * | 4/2003 | Funk | G01C 19/5726 | 73/504.08 |
| 6,564,637 B1 * | 5/2003 | Schalk | G01C 19/5614 | 73/1.38 |
| 6,629,448 B1 * | 10/2003 | Cvancara | G01P 21/00 | 73/1.38 |
| 6,635,509 B1 * | 10/2003 | Ouellet | B81C 1/00333 | 438/106 |
| 6,654,424 B1 * | 11/2003 | Thomae | H03J 7/02 | 329/306 |
| 6,742,389 B2 * | 6/2004 | Nguyen | G01P 15/0802 | 73/504.12 |
| 6,798,674 B2 * | 9/2004 | Kwon | H02M 1/4208 | 363/132 |
| 6,837,107 B2 | 1/2005 | Geen | | |
| 6,848,305 B2 | 2/2005 | Fell et al. | | |
| 6,877,374 B2 * | 4/2005 | Geen | G01C 19/5719 | 73/504.14 |
| 6,883,361 B2 * | 4/2005 | Wyse | G01C 19/5719 | 73/1.38 |
| 6,892,575 B2 | 5/2005 | Nasiri et al. | | |
| 6,892,576 B2 * | 5/2005 | Samuels | B81B 3/0072 | 73/514.32 |
| 6,958,566 B2 * | 10/2005 | Nguyen | H03H 9/02448 | 310/321 |
| 6,985,051 B2 * | 1/2006 | Nguyen | H03H 3/0072 | 333/186 |
| 7,032,451 B2 | 4/2006 | Geen | | |
| 7,036,373 B2 * | 5/2006 | Johnson | G01C 19/5719 | 73/504.02 |
| 7,043,985 B2 * | 5/2006 | Ayazi | G01C 19/5719 | 29/592.1 |
| 7,051,590 B1 * | 5/2006 | Lemkin | G01C 19/5719 | 73/504.04 |
| 7,089,792 B2 * | 8/2006 | Geen | G01C 19/5719 | 73/504.12 |
| 7,123,111 B2 * | 10/2006 | Brunson | G01C 19/5684 | 331/116 M |
| 7,159,461 B2 * | 1/2007 | Gallon | G01C 19/56 | 73/504.04 |
| 7,178,378 B2 | 2/2007 | Crawley et al. | | |
| 7,204,144 B2 | 4/2007 | Geen | | |
| 7,210,337 B1 * | 5/2007 | Jarrett | G01M 3/3281 | 73/49.3 |
| 7,216,539 B2 | 5/2007 | Geen | | |
| 7,240,533 B2 * | 7/2007 | Fell | G01C 19/5677 | 73/1.38 |
| 7,246,512 B2 | 7/2007 | Schroeder | | |
| 7,357,025 B2 | 4/2008 | Geen | | |
| 7,360,423 B2 * | 4/2008 | Ayazi | G01C 19/5677 | 73/504.12 |
| 7,396,476 B2 * | 7/2008 | Ridley | B81C 1/00698 | 216/2 |
| 7,420,318 B1 * | 9/2008 | Pulskamp | H01L 41/096 | 310/311 |
| 7,421,897 B2 * | 9/2008 | Geen | G01C 19/574 | 73/504.12 |
| 7,427,819 B2 | 9/2008 | Hoen et al. | | |
| 7,461,552 B2 * | 12/2008 | Acar | G01P 15/125 | 73/504.04 |
| 7,492,241 B2 * | 2/2009 | Piazza | H03H 3/02 | 310/321 |
| 7,543,496 B2 | 6/2009 | Ayazi et al. | | |
| 7,551,043 B2 | 6/2009 | Nguyen et al. | | |

(56) References Cited

U.S. PATENT DOCUMENTS

| | | | |
|---|---|---|---|
| 7,565,839 B2* | 7/2009 | Stewart | G01C 19/56 73/504.12 |
| 7,581,443 B2* | 9/2009 | Kubena | G01C 19/5684 73/504.12 |
| 7,637,156 B2* | 12/2009 | Araki | G01C 19/5684 73/504.12 |
| 7,640,803 B1* | 1/2010 | Gutierrez | G01C 19/5719 73/504.04 |
| 7,726,188 B2* | 6/2010 | Cardarelli | G01C 19/5719 73/504.12 |
| 7,739,896 B2* | 6/2010 | Stewart | G01C 19/5776 73/1.37 |
| 7,874,209 B2 | 1/2011 | Stewart | |
| 7,886,598 B2* | 2/2011 | Wyse | G01C 19/5649 73/504.12 |
| 7,895,892 B2 | 3/2011 | Aigner | |
| 7,984,648 B2* | 7/2011 | Horning | G01C 19/5719 73/504.04 |
| 8,011,246 B2* | 9/2011 | Stewart | G01C 19/5684 73/1.37 |
| 8,056,413 B2* | 11/2011 | Yazdi | G01C 19/5677 73/504.13 |
| 8,151,641 B2 | 4/2012 | Geen | |
| 8,166,816 B2 | 5/2012 | Ayazi et al. | |
| 8,250,919 B2* | 8/2012 | Ofri | G01C 19/5684 73/504.13 |
| 8,408,060 B2 | 4/2013 | Kuang et al. | |
| 8,561,466 B2* | 10/2013 | Wyse | G01C 19/5656 73/504.12 |
| 8,616,055 B2 | 12/2013 | Geen | |
| 8,616,056 B2 | 12/2013 | Sammoura et al. | |
| 8,631,700 B2 | 1/2014 | Sammoura et al. | |
| 8,677,801 B1 | 3/2014 | Clark et al. | |
| 8,701,459 B2 | 4/2014 | Geen | |
| 8,783,103 B2 | 7/2014 | Clark et al. | |
| 9,091,544 B2* | 7/2015 | Johari-Galle | G01C 19/5684 |
| 2002/0174720 A1* | 11/2002 | Cardarelli | G01P 15/14 73/504.02 |
| 2003/0119220 A1* | 6/2003 | Mlcak | B81B 3/0089 438/52 |
| 2003/0183888 A1* | 10/2003 | Bar-Sadeh | H04R 7/02 257/419 |
| 2004/0050160 A1* | 3/2004 | Bae | G01C 19/5719 73/504.13 |
| 2004/0051595 A1* | 3/2004 | Yoshimine | G01N 29/036 331/158 |
| 2004/0085000 A1* | 5/2004 | Ogiura | G01P 15/0922 310/329 |
| 2004/0134279 A1* | 7/2004 | Fell | G01C 19/5684 73/504.13 |
| 2004/0211257 A1* | 10/2004 | Geen | G01C 19/5712 73/504.04 |
| 2005/0072230 A1* | 4/2005 | Koike | G01C 19/5642 73/504.12 |
| 2005/0081633 A1* | 4/2005 | Nasiri | G01C 19/5712 73/514.29 |
| 2005/0148065 A1* | 7/2005 | Zhang | B82Y 15/00 435/287.2 |
| 2005/0205959 A1* | 9/2005 | Chau | B81B 7/0041 257/467 |
| 2006/0021433 A1* | 2/2006 | Willig | G01C 19/56 73/504.02 |
| 2006/0133953 A1 | 6/2006 | Zhang et al. | |
| 2006/0150745 A1* | 7/2006 | Lang | G01C 19/5712 73/849 |
| 2006/0196253 A1* | 9/2006 | Crawley | B81B 3/0089 73/53.01 |
| 2006/0197411 A1* | 9/2006 | Hoen | G01L 1/165 310/320 |
| 2006/0201233 A1* | 9/2006 | Schroeder | G01C 25/00 73/1.77 |
| 2006/0237806 A1* | 10/2006 | Martin | B81C 1/00182 257/415 |
| 2006/0238078 A1* | 10/2006 | Liu | G01C 19/5698 310/338 |
| 2007/0046398 A1* | 3/2007 | Nguyen | H03H 3/0072 333/186 |
| 2007/0119258 A1* | 5/2007 | Yee | G01C 19/5684 73/649 |
| 2007/0172940 A9* | 7/2007 | Manalis | B01L 3/502707 435/287.2 |
| 2007/0220971 A1* | 9/2007 | Ayazi | G01C 19/5698 73/504.02 |
| 2007/0256495 A1* | 11/2007 | Watson | G01C 19/56 73/504.12 |
| 2007/0284971 A1* | 12/2007 | Sano | H03H 9/02094 310/364 |
| 2008/0054759 A1* | 3/2008 | Ayazi | B81C 1/0023 310/309 |
| 2008/0180890 A1* | 7/2008 | Bolis | B81C 1/00333 361/824 |
| 2008/0190181 A1* | 8/2008 | Khuri-Yakub | G01N 29/022 73/64.53 |
| 2008/0282833 A1* | 11/2008 | Chaumet | G01C 19/5747 74/5 R |
| 2009/0064781 A1 | 3/2009 | Ayazi et al. | 73/504.12 |
| 2009/0095079 A1* | 4/2009 | Ayazi | G01P 15/0975 73/514.29 |
| 2009/0114016 A1* | 5/2009 | Nasiri | G01C 19/5719 73/504.12 |
| 2009/0133498 A1* | 5/2009 | Lo | G01C 19/5663 73/504.13 |
| 2009/0173157 A1* | 7/2009 | Stewart | G01C 19/5698 73/504.13 |
| 2009/0173158 A1* | 7/2009 | Gehring | G01N 29/022 73/590 |
| 2009/0188317 A1* | 7/2009 | Aigner | G01C 19/5698 73/504.01 |
| 2009/0266162 A1 | 10/2009 | Ayazi et al. | |
| 2009/0277271 A1* | 11/2009 | Seppa | G01N 29/022 73/627 |
| 2010/0058861 A1* | 3/2010 | Kuang | G01C 19/5677 73/504.12 |
| 2010/0089158 A1 | 4/2010 | Watson | 73/504.12 |
| 2010/0148341 A1* | 6/2010 | Fuji | B81B 7/007 257/686 |
| 2010/0218606 A1* | 9/2010 | Fell | G01C 19/5684 73/504.13 |
| 2010/0263445 A1 | 10/2010 | Hayner et al. | |
| 2010/0294039 A1* | 11/2010 | Geen | G01C 19/5776 73/504.12 |
| 2011/0023601 A1* | 2/2011 | Ikeda | G01C 19/5684 73/504.13 |
| 2011/0030474 A1* | 2/2011 | Kuang | G01C 19/5712 73/504.16 |
| 2011/0041609 A1* | 2/2011 | Clark | G01P 15/097 73/514.29 |
| 2011/0146402 A1* | 6/2011 | Donadel | G01P 21/00 73/504.12 |
| 2011/0167891 A1* | 7/2011 | Geen | G01C 25/005 73/1.38 |
| 2011/0192226 A1* | 8/2011 | Hayner | G01C 19/5776 73/504.12 |
| 2011/0254599 A1* | 10/2011 | Dikshit | H03L 3/00 327/156 |
| 2011/0270569 A1* | 11/2011 | Stephanou | G01C 19/5712 702/141 |
| 2012/0013774 A1* | 1/2012 | Kim | H04N 5/361 348/246 |
| 2012/0111112 A1* | 5/2012 | Sammoura | G01C 19/5698 73/514.01 |
| 2012/0111113 A1* | 5/2012 | Sammoura | G01C 19/5698 73/514.01 |
| 2012/0112765 A1* | 5/2012 | Sparks | G01N 29/022 324/633 |
| 2012/0137773 A1* | 6/2012 | Judy | G01C 19/5684 73/504.12 |

(56) References Cited

U.S. PATENT DOCUMENTS

| | | | | |
|---|---|---|---|---|
| 2012/0137774 | A1* | 6/2012 | Judy | G01C 19/5698 73/504.12 |
| 2012/0195797 | A1* | 8/2012 | Sparks | G01N 29/022 422/69 |
| 2012/0227487 | A1* | 9/2012 | Ayazi | G01C 19/5698 73/504.08 |
| 2013/0283911 | A1* | 10/2013 | Ayazi | G01C 19/5684 73/504.12 |
| 2014/0102195 | A1 | 4/2014 | Geen | |
| 2014/0250970 | A1 | 9/2014 | Fang et al. | 73/1.37 |

FOREIGN PATENT DOCUMENTS

| | | | |
|---|---|---|---|
| EP | 1733468 | 3/2009 | |
| EP | 2 078 925 | 7/2009 | |
| EP | 2216904 | 8/2010 | |
| FR | 2849183 | 6/2004 | |
| JP | 9116250 | 5/1997 | |
| JP | 10-103960 | 4/1998 | |
| JP | 2004 301734 | 10/2004 | |
| JP | 2006-514749 | 5/2006 | |
| JP | 2007-139642 | 6/2007 | |
| JP | 2007-205975 | 8/2007 | |
| WO | WO 99/47891 | 9/1999 | |
| WO | WO 03/025504 | 3/2003 | |
| WO | WO 2007/061610 | 5/2007 | |
| WO | WO 2009/066640 | 5/2009 | |
| WO | WO 2014/093727 A1 | 6/2014 | G01C 19/56 |

OTHER PUBLICATIONS

Patent Cooperation Treaty (PCT), PCT/US2016/018381, Written Opinion of the Interantional Searching Authority; ISA, dated Jun. 1, 2016, 9 pages.*

Patent Cooperation Treaty (PCT), PCT/US2016/018381, International Search Report; ISA, dated Mar. 20, 20156, 4 pages.*

Gregory, "Characterization Control and Compensation of MEMS Rate and Rate-Integrating Gyroscopes", The University of Michigan, Ann Arbor, MI, 198 pages, 2012.

Gregory, "Novel mismatch compensation methods for rate-integrating gyroscopes", Center for Wireless Integrated Microsensing and Systems (WIMS), University of Michigan, Ann Arbor, MI, 7 pages, 2012.

Raman et al., "A Closed-Loop Digitally Controlled MEMS Gyroscope with Unconstrained Sigma-Delta Force-Feedback", IEEE Sensors Journal (ISSN: 1530437X), vol. 9, Issue 3, pp. 297-305, Mar. 2009.

Sonmezoglu et al., "An Automatically Mode-Matched MEMS Gyroscope With Wide and Tunable Bandwidth", Journal of Microelectromechanical Systems, vol. 23, No. 2, pp. 284-297, Apr. 2014.

Tatar et al., "Quadrature-Error Compensation and Corresponding Effects on the Performance of Fully Decoupled MEMS Gyroscopes", Journal of Microelectromechanical Systems, vol. 21, No. 3, pp. 656-667, Jun. 2012.

Xia et al., "A Digitalized Silicon Microgyroscope Based on Embedded FPGA", Sensors (ISSN: 1424-8220), vol. 12, pp. 13150-13166, 2012.

International Searching Authority, International Search Report—International Application No. PCT/US2016/018381, dated Jun. 1, 2016, together with the Written Opinion of the International Searching Authority, 16 pages.

Apostolyuk et al., "Dynamics of Micromechanical Coriolis Vibratory Gyroscopes," Sensor Letters. vol. 2, 1-8, 2005.

Ayazi, "Integrated Solutions for Motion Sensing in Handheld Devices," Qualtré, http://www.qualtre.com/motion-sensing-technology/, 3 pages, Oct. 2010.

Ayazi et al., "High Aspect-Ratio Combined Poly and Single-Crystal Silicon (HARPSS) MEMS Technology," Journal of Microelectromechanical Systems, vol. 9, No. 3, pp. 288-294, Sep. 2000.

Ayazi et al., "Design and Fabrication of a High-Performance Polysilicon Vibrating Ring Gyroscope," Eleventh IEEE/ASME International Workshop on Micro Electro Mechanical Systems, Heidelberg, Germany, 6 pages, Jan. 25-29, 1998.

Ayazi et al., "A HARPSS Polysilicon Vibrating Ring Gyroscope;" Journal of Microelectrical Systems, vol. 10, No. 2, pp. 169-179, Jun. 2001.

Benes et al., "Comparison Between BAW and SAW Sensor Principles," IEEE Transactions on Ultrasonics, Ferroelectrics and Frequency Control, vol. 45 No. 5, pp. 1314-1330, Sep. 1998.

Bernstein, "An Overview of MEMS Inertial Sensing Technology," Sensors, http://www.sensorsmag.com/sensors/acceleration-vibration/an-overview-mems-inertial-sensing-technology-970, 6 pages, Feb. 1, 2003.

Celikel et al., "Optoelectronic Design Parameters of Interferometric Fiber Optic Gyroscope with $LiNbO_3$ having North Finder Capability and Earth Rotation Rate Measurement," Indian Journal of Pure & Applied Physics, vol. 48, pp. 375-384, Jun. 2010.

Doe, "Qualtré Targets 3-Axis Gyro Market with Alternative Technology," MEMS Trends, Issue No. 3, 1 page, Jul. 2010.

Drafts, "Acoustic Wave Technology Sensors," Sensors (www.sensorsmag.com), 5 pages, Oct. 1, 2000.

Dubois, "Thin film bulk acoustic wave resonators: a technology overview," MEMSWAVE 03, Toulouse, France, 4 pages, Jul. 2-4, 2003.

Geen et al., "New iMEMS® Angular-Rate-Sensing Gyroscope," Analog Dialogue 37-03, pp. 1-4, 2003.

Jeong et al., "A Study on Resonant Frequency and Q Factor Tunings for MEMS Vibratory Gyroscopes," Journal of Micromechanics and Microengineering, vol. 14, pp. 1530-1536, 2004.

Jiang et al., "A Monolithic Surface Micromachined Z-Axis Gyroscope with Digital Output," *Symposium on VLSI Circuits*, 4 pages, Jun. 2000.

Johari, "Micromachined Capacitive Silicon Bulk Acoustic Wave Gyroscopes," A Dissertation Presented to the Academic Faculty in Partial Fulfillment of the Requirements for the Degree Doctor of Philosophy in the School of Mechanical Engineering Georgia Institute of Technology, 28 pages, Dec. 2008.

Johari et al., "High-Frequency Capacitive Disk Gyroscope in (100) and (111) Silicon," IEEE, MEMS 2007, Kobe, Japan, pp. 47-50, Jan. 21-25, 2007.

Johari et al., "Capacitive Bulk Wave Silicon Disk Gyroscopes," Electron Devices Meeting, 2006, 4 pages, Dec. 1, 2006.

Johnson, "Qualtre Preps Solid State MEMS Gyros," *MEMS Investor Journal*, http://www.memsinvestorjournal.com/2010/04/qualtre-preps-solidstate-mems-gyros.html_, 2 pages, Apr. 8, 2010.

Link, "Angular Rate Detector DAVED®-RR," Application Report SE 090.2, Institute of Micromachining and Information Technology, http://hsgimit.de/fileadmin/gfx/pdfs/AnwendungsberichtSE090_2r_englisch_V1.pdf, 1 page, Dec. 11, 2007.

Link, "Angular Rate Detector DAVED®-LL" Application Report SE 100.1, Institute of Micromachining and Information Technology, hsgimit.de/fileadmin/gfx/pdfs/anwendungsberichtse100_111_englisch01.pdf,1 page, Dec. 11, 2007.

Nasiri, "A Critical Review of MEMS Gyroscopes Technology and Commercialization Status," InvenSense, www.scantec.de/uploads/media/MEMSGyroComp_02.pdf, 8 pages, 2005.

Ramirez, "45 RF MEMS Based Circuit Design," PZE Energy Harvester—conocimeintos.com.ve, http://conocimientosrfmemsdesign.blogspot.com/2010/07/pze-energy-harvester.html, 4 pages, Jul. 24, 2010.

Satrom et al., "Disc Resonating Gyroscopes: A Summary of a Recent Development in MEMS Technology," Northwestern University, http://www/google.com/url?sa=t&rct=j&q=&esrc=s&frm=1&source=web&cd1&ssqi=2&ved=0CCQQFjAA&url=htpp%3A%2F%2Fclifton.mech.northwestern.edu%2F2F06fall%2FFruthSatrom.pdf&ei=ZOsyT6D3IMjMrQfE6qSnDA&usg=AFQjCNFX0j00sAsF6bMdfEV70D7JzzLkBw&sig2=jwpU1Tgot45sT_fgi81zMw, 15 pages, Dec. 1, 2006.

Saukoski, "System and Circuit Design for a Capacitive MEMS Gyroscope," Doctoral Dissertation, TKK Dissertations 116, Helsinki University of Technology, 279 pages, 2008.

(56) References Cited

OTHER PUBLICATIONS

Seshia et al., "An Integrated Microelectromechanical Resonant Output Gyroscope," Proceedings, 15$^{th}$ IEEE Micro Mechanical Systems Conference, 5 pages 2002.
Shkel et al., "Two Types of Micromachined Vibratory Gyroscopes," IEEE, pp. 531-536, 2005.
Tatar, "Quadrature Error Compensation and its Effects on the Performance of Fully Decoupled MEMS Gyroscopes," A Thesis Submitted to the Graduate School of Natural and Applied Sciences of Middle East Technical University, 169 pages, Sep. 2010.
Weinberg et al., "Error Sources in In-Plane Silicon Tuning-Fork MEMS Gyroscopes," *The Draper Technology Digest, Draper Laboratory*, vol. 11, 16 pages, 2007.
Xie et al., "Fabrication, Characterization, and Analysis of the DRIE CMOS-MEMO Gyroscope," IEEE Sensors Journal, vol. 3, No. 5, pp. 622-631, Oct. 2003.
Yang et al., "An electro-thermal bimorph-based microactuator for precise track-positioning of optical disk drives;" Journal of Micromechanics and Microengineering, vol. 15, pp. 958-965, 2005.
International Preliminary Report on Patentability dated Oct. 5, 2017 in connection with International Application No. PCT/US2016/018381.

\* cited by examiner

GYROSCOPE THAT COMPENSATES FOR FLUCTUATIONS IN SENSITIVITY

TECHNICAL FIELD

The present invention relates to adjusting the rate signal of a gyroscope to compensate for the device's sensitivity, and more particularly, to adjusting the frequency of a test signal to determine the sensitivity of the gyroscope.

BACKGROUND ART

Micromachined (MEMS) gyroscopes have become established as useful commercial items. Gyroscope performance is very sensitive to such things as manufacturing variations, errors in packaging, driving, linear acceleration, and temperature, among other things. Basic principles of operation of angular-rate sensing gyroscopes are well understood and described in the prior art (e.g., Geen, J. et al., New iMEMS Angular-Rate-Sensing Gyroscope, Analog Devices, Inc., Analog Dialog 37-03 (2003), available at http://www.analog.com/library/analogDialogue/archives/37-03/gyro.html, which is hereby incorporated herein by reference in its entirety).

The principles of vibratory sensing angular rate gyroscopes with discrete masses are long-established (see, for example, Lyman, U.S. Pat. No. 2,309,853 and Lyman, U.S. Pat. No. 2,513,340, each of which is hereby incorporated herein by reference in its entirety). Generally speaking, a vibratory rate gyroscope works by oscillating a proof mass (also referred to herein as a "shuttle" or "resonator"). The oscillation is generated with a periodic force applied to a spring-mass-damper system at the resonant frequency. Operating at resonance allows the oscillation amplitude to be large relative to the force applied. When the gyroscope is rotated, Coriolis acceleration is generated on the oscillating proof mass in a direction orthogonal to both the driven oscillation and the rotation. The magnitude of Coriolis acceleration is proportional to both the velocity of the oscillating proof mass and the rotation rate. The resulting Coriolis acceleration can be measured by sensing the deflections of the proof mass. The electrical and mechanical structures used to sense such deflections of the proof mass are referred to generally as the accelerometer.

Many MEMS gyroscopes employ balanced comb drives of the type described generally in Tang, U.S. Pat. No. 5,025,346, which is hereby incorporated herein by reference in its entirety. General use of a micromachined layer above a semiconductor substrate with Coriolis sensing perpendicular to that substrate is described generally in Zabler, U.S. Pat. No. 5,275,047, which is hereby incorporated herein by reference in its entirety. Exemplary MEMS gyroscopes are described in Bernstein, U.S. Pat. No. 5,349,855; Dunn, U.S. Pat. No. 5,359,893; Geen, U.S. Pat. No. 5,635,640; Geen, U.S. Pat. No. 5,869,760; Zerbini, U.S. Pat. No. 6,370,954; and Geen U.S. Pat. No. 6,837,107, each of which is hereby incorporated herein by reference in its entirety. The latter four patents employ rotationally vibrated mass(es).

One problem in the manufacture of MEMS gyroscopes is that the Coriolis signals on which they depend are relatively small. It has been long recognized (e.g. Ljung, U.S. Pat. No. 4,884,446 or O'Brien, U.S. Pat. No. 5,392,650 or Clark, U.S. Pat. No. 5,992,233, each of which is hereby incorporated herein by reference in its entirety) that the signal size of a vibratory gyroscope can be magnified by operating the Coriolis accelerometer at resonance, i.e., by matching the frequencies of the accelerometer to that of the vibrating shuttle. Generally speaking, this increase in signal size eases the associated electronics requirements and thereby reduces cost. However, generally speaking, the larger the resonant amplification, the more sensitive is the accelerometer phase shift to small frequency perturbations. Such phase shifts are particularly deleterious to gyroscope performance, so it is generally necessary, in practice, to either well separate the frequencies or tightly servo the frequency of the accelerometer to the frequency of the shuttle. A mechanism for controlling the frequency of a differential capacitance accelerometer is conveniently available from changing the applied common mode voltage.

One technique for sensing the frequency match in order to close a servo loop around that mechanism is to apply a small, periodic perturbation to the mechanism and servo to zero response modulated at that periodicity. This is analogous to the mode matching servo commonly used in laser gyroscopes (e.g. Ljung, U.S. Pat. No. 4,267,478 or Curley, U.S. Pat. No. 4,755,057, each of which is hereby incorporated herein by reference in its entirety). This method uses the quadrature signal which directly couples from the shuttle and which can be separated from the useful, in-phase signal by synchronous demodulation. In practice, the magnitude of that signal generally varies widely and therefore is generally also subject to some control mechanism if the mode-matching servo is to have defined gain. This would be straightforward were it not that a real system generally has some other phase errors so that, for best gyro performance, the magnitude of quadrature signal should be near zero.

Another, method would be to apply a shuttle-frequency signal electromechanically to the accelerometer and synchronously demodulate the displacement output, servoing for the null which occurs at the 90 degree resonant phase shift. This inevitably interferes with the Coriolis signal and effectively is only applicable to those gyroscopes that do not need static response, such as camera stabilizing gyros.

The problem is addressed, at the expense of complexity, in Thomae, U.S. Pat. No. 6,654,424, which is hereby incorporated herein by reference in its entirety, by applying two such signals symmetrically disposed about the desired resonance and servoing for equality of response from them. This involves two signal generators, two demodulators, two filters and a differencing means, over twice the circuitry which one might otherwise expect for the servo.

In vibratory rate gyroscopes, numerous factors, such as imperfections in the various mechanical structures and in the electronics used for driving and sensing, can cause oscillations of the accelerometer that can be confused with Coriolis acceleration and rotation rate. Such error sources are often referred to collectively as gyroscope offset. There are two main classes of gyroscope offset, namely in-phase error and quadrature error. Generally speaking, quadrature error results when the vibratory motion is not perfectly orthogonal to the accelerometer. In the presence of quadrature error, the accelerometer experiences deflections proportional to the driven displacement. In-phase error results when the vibratory drive force is not perfectly orthogonal to the accelerometer. With in-phase error, the accelerometer experiences deflections proportional to the oscillation driving force which, at resonance, is also proportional to the oscillation velocity. Gyroscope offset can vary over time, for example, due to changes in temperature.

One possible approach to reducing gyroscope offset is to attempt to minimize the offset through device design, manufacture, and packaging, but there are practical limits to this approach.

Thus, the rate signal output by a gyroscope depends on the gyroscope's sensitivity. Because the sensitivity can fluctuate due to ambient temperature, the gyroscope may introduce different amounts of error into the rate signal depending on its environment. In this manner, for the same amount of rotation, the gyroscope would output different rate signals at different temperatures.

SUMMARY OF THE EMBODIMENTS

In one aspect of the invention, a method compensates for a sensitivity of an inertial sensor having a resonator and an accelerometer. The method includes adding a test signal to a quadrature tuning voltage applied to the resonator of the inertial sensor. The method also includes receiving a quadrature error signal from the accelerometer of the inertial sensor. The method also includes detecting a phase difference between the quadrature error signal and the test signal. The method also includes determining a bandwidth of the accelerometer based on the detected phase difference, the bandwidth indicating the sensitivity of the accelerometer.

The method may also include removing errors from an output rate signal of the accelerometer according to the determined bandwidth of the accelerometer. These errors may be caused by fluctuations in sensitivity of the accelerator.

In these embodiments, the method may determining the bandwidth of the accelerometer by determining a time constant $\tau$ of the accelerometer based on the detected phase difference. Moreover, the output rate signal may be represented by $xA_g\tau\Omega$. Furthermore, the method may include removing errors from an output rate signal of the accelerometer according to the determined bandwidth of the accelerometer. The errors may be removed by multiplying the output rate signal by the inverse of the determined time constant.

In some embodiments, the method also includes adjusting a frequency of the test signal until the phase difference is about equal to a predetermined value. For example, the frequency may be adjusted until the phase difference is about equal to 45 degrees. Additionally, in these embodiments, the phase difference between the quadrature error signal and the test signal may be determined by demodulating the quadrature error signal with the test signal, and determining a direct current (DC) component of the demodulated quadrature error signal. Furthermore, the frequency of the test signal may be adjusted until the direct current (DC) component of the demodulated quadrature error signal is about zero (0).

In some embodiments, detecting the phase difference between the quadrature error signal and the test signal may include demodulating the quadrature error signal with the test signal. Determining the bandwidth of the accelerometer may include determining an alternative current (AC) component of the demodulated quadrature error signal.

In another aspect of the invention, an inertial sensor that compensates for its own sensitivity includes a resonator, an accelerometer, a sensitivity circuit, and a compensating circuit. The sensitivity circuit includes a phase difference detector that detects a phase difference between a quadrature error signal from the accelerometer and a test signal. The sensitivity circuit also includes a test signal generator that generates the test signal, receives the phase difference from the phase difference detector, and adjusts a frequency of the test signal based on the phase difference. The sensitivity circuit also includes a sensitivity gauge that generates a sensitivity signal, indicative of the bandwidth of the accelerometer, based on the phase difference. The compensating circuit adjusts an output rate signal from the accelerometer based on the sensitivity signal from the sensitivity gauge.

The phase difference detector may demodulate the quadrature error signal with the test signal. The test signal generator may adjust the frequency of the test signal until the quadrature error signal and the test signal are about 45 degrees out of phase. The test signal generator may adjust the frequency of the test signal until the direct current (DC) component of the phase difference is about zero (0). The sensitivity gauge may generate the sensitivity signal based on the alternating current (AC) component of the phase difference. The compensating circuit may multiply the output rate signal by the sensitivity signal.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

For mode-matched gyroscopes, the sensitivity of a gyroscope introduces error into the output rate signal. Because the sensitivity fluctuates with temperature, the error in the rate signal also varies. The present solution measures the error without disturbing the normal operation of the gyroscope and removes the impact of the error from the output rate signal, thereby enabling a more accurate output to be obtained from the gyroscope.

The sensitivity of the gyroscope is manifested, at least in part, by the time constant $\tau$ of the accelerometer. The time constant $\tau$ is related to the rate at which the accelerometer dissipates energy (e.g., the rate of decay of the accelerometer's amplitude), which can change with ambient temperature. Additionally, the rate signal output by the accelerometer of the gyroscope is proportional to the time constant $\tau$. Assuming the gyroscope has been mode-matched (for example, by dithering the quadrature tuning voltage at a fixed dither frequency and effectively adjusting the spring constant of the accelerometer to match the accelerometer resonance frequency with the gyroscope resonator frequency as described in U.S. Pat. No. 8,151,641, entitled "Mode-Matching Apparatus and Method for Micromachined Inertial Sensors", filed May 21, 2009, and hereby incorporated by reference in its entirety), the rate signal may be represented by:

$$xA_g\tau\Omega$$

where $\Omega$ represents the rate of rotation;
x represents the velocity of the gyroscope's motion; and
Ag represents the gain of the gyroscope.

Therefore, measuring the time constant τ to remove its impact from the output rate signal will better enable the rate of rotation Ω to be accurately assessed.

Figure 1:
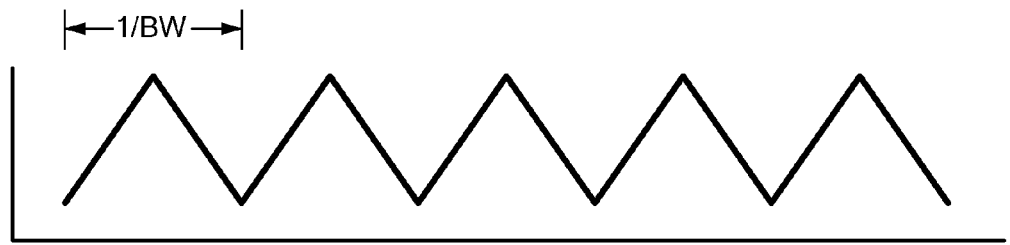
FIG. 1 depicts an exemplary signal from the Coriolis sense channel of an accelerometer in a gyroscope, wherein the signal includes information about the bandwidth of the channel, and thus, the time constant $\tau$ of the gyroscope.

Furthermore, the time constant τ has an inverse relationship with the bandwidth BW of the Coriolis sense channel of the accelerometer, namely, the bandwidth BW is proportional to 1/τ. Because signals from the Coriolis sense channel include information about the channel's bandwidth BW, and in turn, the time constant τ, these signals are processed to measure the time constant τ. An exemplary Coriolis sense channel signal carrying information about the channel's bandwidth BW, and thus the time constant τ, is depicted in FIG. 1.

Figure 2:
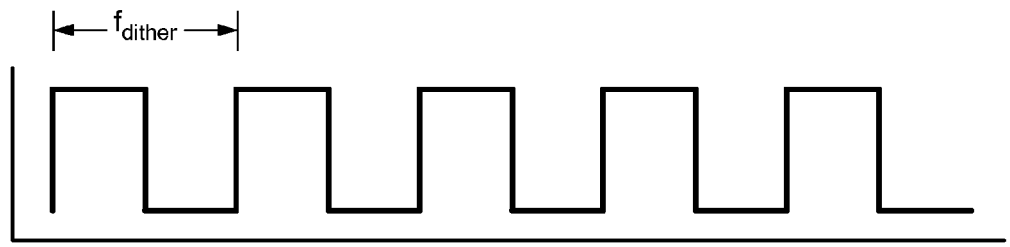
FIG. 2 depicts an exemplary dither signal whose frequency matches the bandwidth of the Coriolis sense channel.

The present solution compares a signal from the Coriolis sense channel (namely, the quadrature error signal) with a test signal used to dither the quadrature tuning voltage, and the phase difference indicates the relationship between the frequency of the test signal (also referred to herein as a "dither signal") and the bandwidth of the Coriolis sense channel. When the dither frequency matches the bandwidth BW, the phase difference of the response will equal 45 degrees. An exemplary dither signal whose frequency matches the bandwidth of the Coriolis sense channel is depicted in FIG. 2. The present solution adjusts the dither frequency until the phase difference equals 45 degrees, measures the bandwidth BW (and consequently, the inverse of the time constant τ) from the response to the dither, and adjusts the output rate signal to remove the impact of the sensitivity of the gyroscope.

Figure 3:
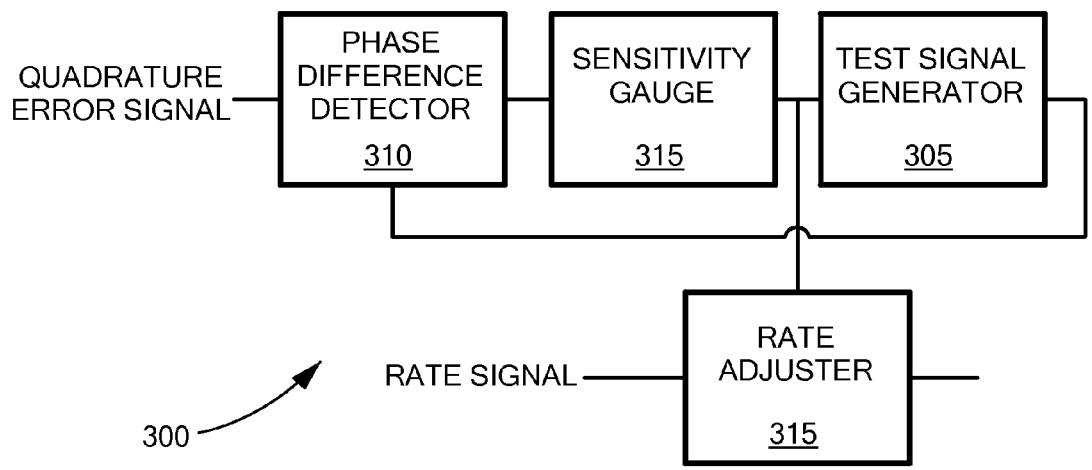
FIG. 3 depicts an exemplary system for compensating for the sensitivity of the gyroscope in the output rate signal.

FIG. 3 depicts an exemplary embodiment of a system 300 that compensates for the sensitivity of the gyroscope in the output rate signal. The system 300, which is incorporated into a gyroscope, receives a quadrature error signal from the accelerometer of the inertial sensor. The quadrature error signal is based on a signal from the Coriolis sense channel and includes information about the bandwidth of the channel. The system 300 also includes a test signal generator 305 that generates a dither signal. In various embodiments, the test signal generator 305 may be a numerical control oscillator or a voltage control oscillator.

The phase difference detector 310 receives the quadrature error signal and the dither signal and determines the phase difference (also referred to herein as a "phase difference") between the two signals. In some embodiments, the phase difference detector 310 may demodulate the quadrature error signal with the dither signal to output the phase difference. In some embodiments, the sensitivity gauge 315 passes the phase difference to the test signal generator 305, and in other embodiments, the test signal generator 305 may receive the phase difference directly from the phase difference detector 310.

The test signal generator 305 adjusts the frequency of the dither signal until the phase difference between the quadrature error signal and the dither signal is 45 degrees. Under these conditions, the frequency of the dither signal matches the bandwidth of the Coriolis sense channel. If the frequency is higher than the bandwidth, the quadrature error signal and the dither signal would be about 90 degrees out of phase, and if the frequency is lower than the bandwidth, the two signals would be in phase.

In some embodiments, the magnitude of the direct current (DC) component of the phase difference may be proportional to the difference between the dither frequency and the bandwidth of the Coriolis signal. Thus, the DC component may indicate the phase difference between the quadrature error signal and the dither signal. For example, when the two signals are 45 degrees out of phase, demodulating the quadrature error signal with the dither signal produces a phase difference with a DC component of zero (0) or about zero. As a result, the test signal generator 305 may receive the phase difference and increase or decrease the dither frequency until it receives a signal with zero (0) DC component. In this manner, the phase difference detector 310, the sensitivity gauge 315, and the test signal generator 305 may operate collectively like a phase-locked loop.

After the test signal generator 305 drives the DC component of the phase difference to zero (0), the sensitivity gauge 315 measures the sensitivity of the gyroscope based on the phase difference. In some embodiments, the gauge 315 is a PI (e.g., proportional and integral) controller. Thus, the sensitivity gauge 315 may integrate the phase difference. In some embodiments, the sensitivity gauge 315 integrates the alternating current (AC) component of the phase difference. In some embodiments, the gauge 315 is a counter that accumulates the phase difference. In any of these embodiments, the output of the gauge 315 is inversely proportional to the time constant τ of the gyroscope, e.g., 1/τ.

The sensitivity gauge 315 sends its output signal 1/τ to the rate adjuster 350, which also receives the output rate signal of the gyroscope. In some embodiments, the rate adjuster 350 multiplies the sensitivity signal 1/τ by the output rate signal. Because the output rate signal is represented by $xA_g\tau\Omega$, this multiplication removes the time constant τ from the rate signal, leaving $xA_g\Omega$. Because a variable error has been removed from the output rate signal, the rate of rotation may be more reliably assessed.

In this embodiment, the test signal generator 305 adjusts the frequency of the dither signal to drive the DC component of the phase difference to zero (0), and then the sensitivity gauge 315 determines the bandwidth of the accelerometer. However, in other embodiments, the test signal generator 305 may not receive feedback from the phase difference detector 310 or the sensitivity gauge 315. Instead, the test signal generator 305 merely provides a dither signal to the phase difference detector 310, and the sensitivity gauge 315 determines the bandwidth of the accelerometer from the detector's 310. For example, the sensitivity gauge 315 may use both the alternating and direct current components (AC/DC) of the detector's 310 output to determine the bandwidth.

Figure 4:
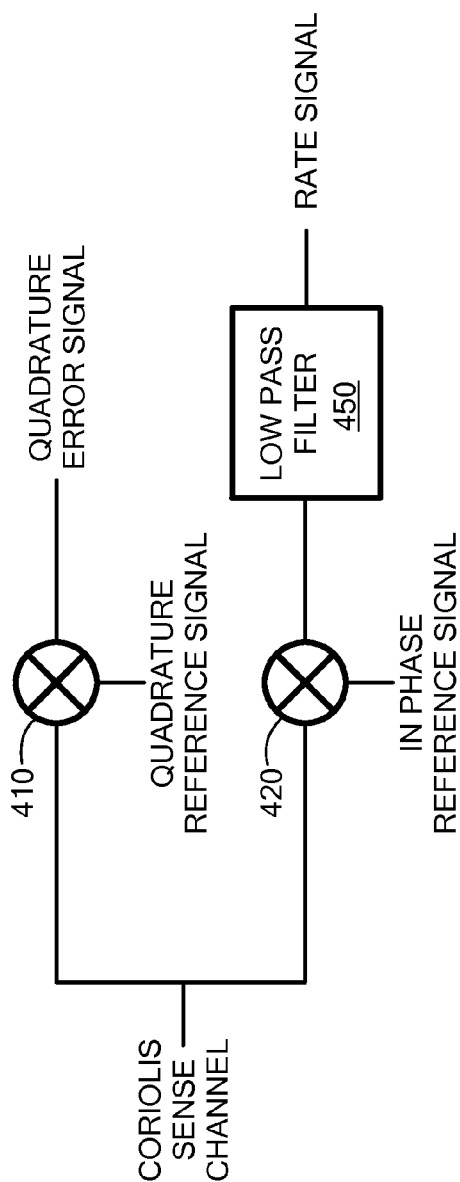
FIG. 4 is a schematic block diagram of a system for producing the quadrature control signal used in determining the sensitivity of the gyroscope and the output rate signal.

FIG. 4 demonstrates how the quadrature error signal and output rate signal are produced in accordance with one exemplary embodiment. High frequency signals from the Coriolis sense channel are demodulated 410 with a quadrature reference signal generated by the resonator of the gyroscope to produce the quadrature error signal. This lower frequency quadrature error signal retains information about the bandwidth of the Coriolis sense channel, and is further used to determine the sensitivity of the gyroscope.

The same Coriolis sense channel signals are also demodulated 420 with an in phase reference signal from the resonator. The resulting signal is filtered using a low pass filter 450 to produce the rate signal, which remains proportionate to the time constant τ of the gyroscope. In some embodiments, the low pass filter 450 filters out components of the signal above the dither frequency.

Figure 5:
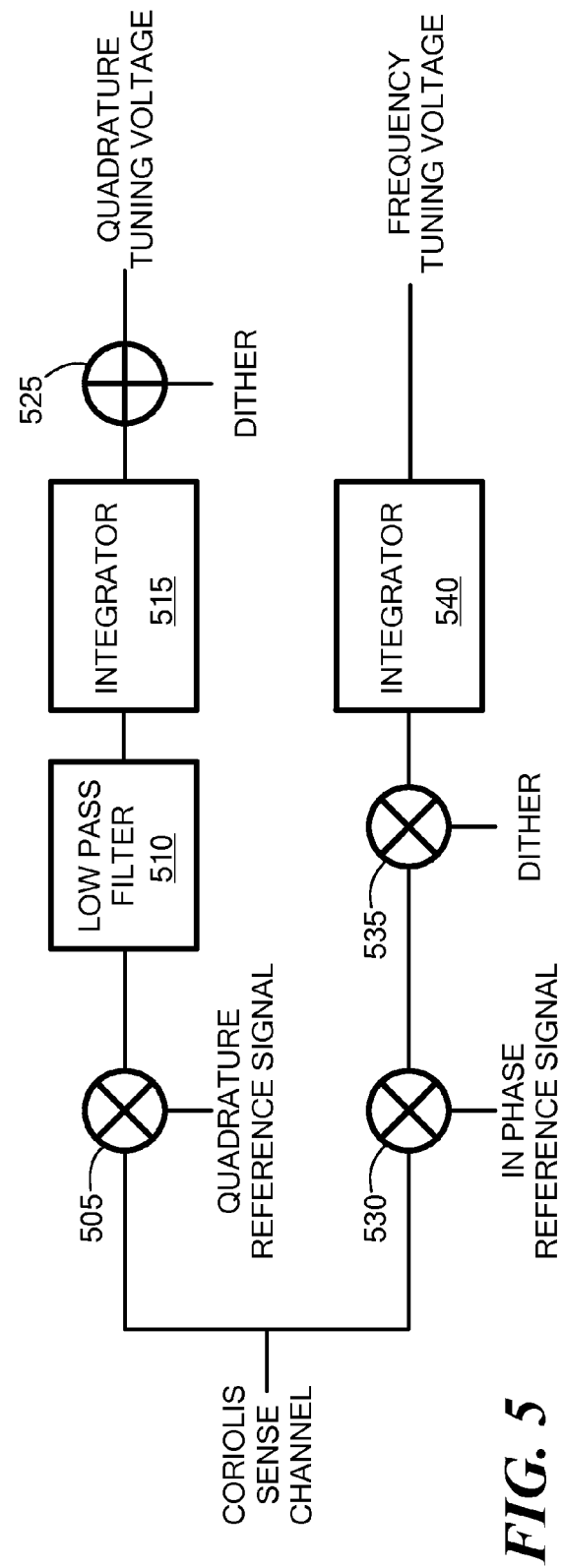
FIG. 5 is a schematic block diagram of a system for producing the quadrature and frequency tuning voltages, to be used in conjunction with the systems described in FIGS. 2-4.

FIG. 5 demonstrates how the quadrature and frequency tuning voltages are produced, in accordance with one exemplary embodiment. High frequency signals from the Coriolis sense channel are demodulated with a quadrature reference signal generated by the resonator of the gyroscope (e.g., the same quadrature reference signal used in the demodulation 410 to produce the quadrature control signal). This lower frequency signal is filtered via a low pass filter 510, and the result is summed via an integrator 515. The resulting signal is added 525 with a dither signal to produce the quadrature turning voltage.

The same Coriolis sense channel signals are also demodulated 530 with an in phase reference signal from the resonator (e.g., the same in phase reference signal used in the demodulation 420 used in producing the rate signal). The resulting signal is further demodulated 535 using a dither signal 535, and then summed via an integrator 540 to product the frequency tuning voltage.

Figure 6:
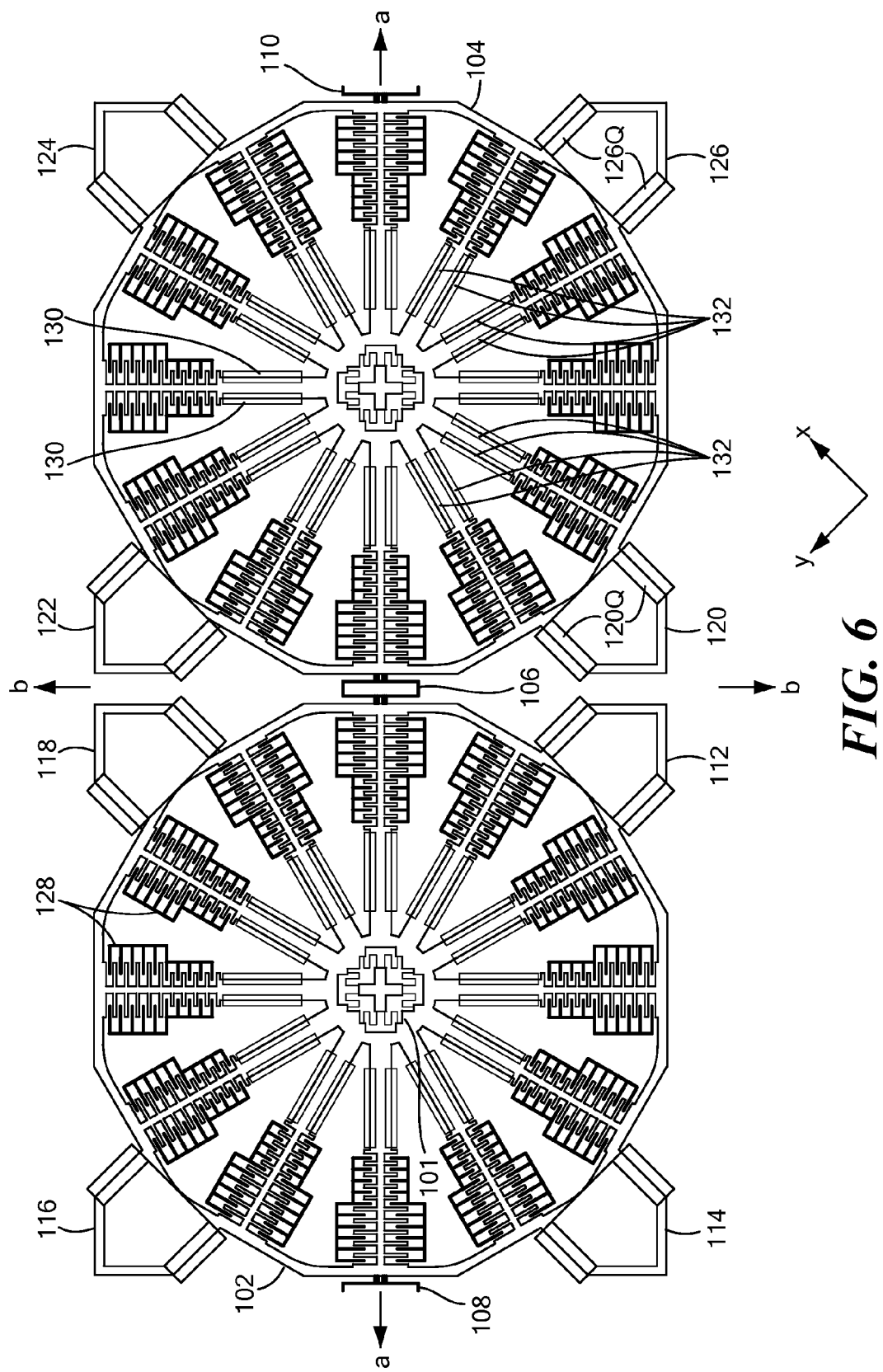
FIGS. 6 and 7 depict an exemplary gyroscope that may incorporate the systems of FIGS. 1-5.
Figure 7:
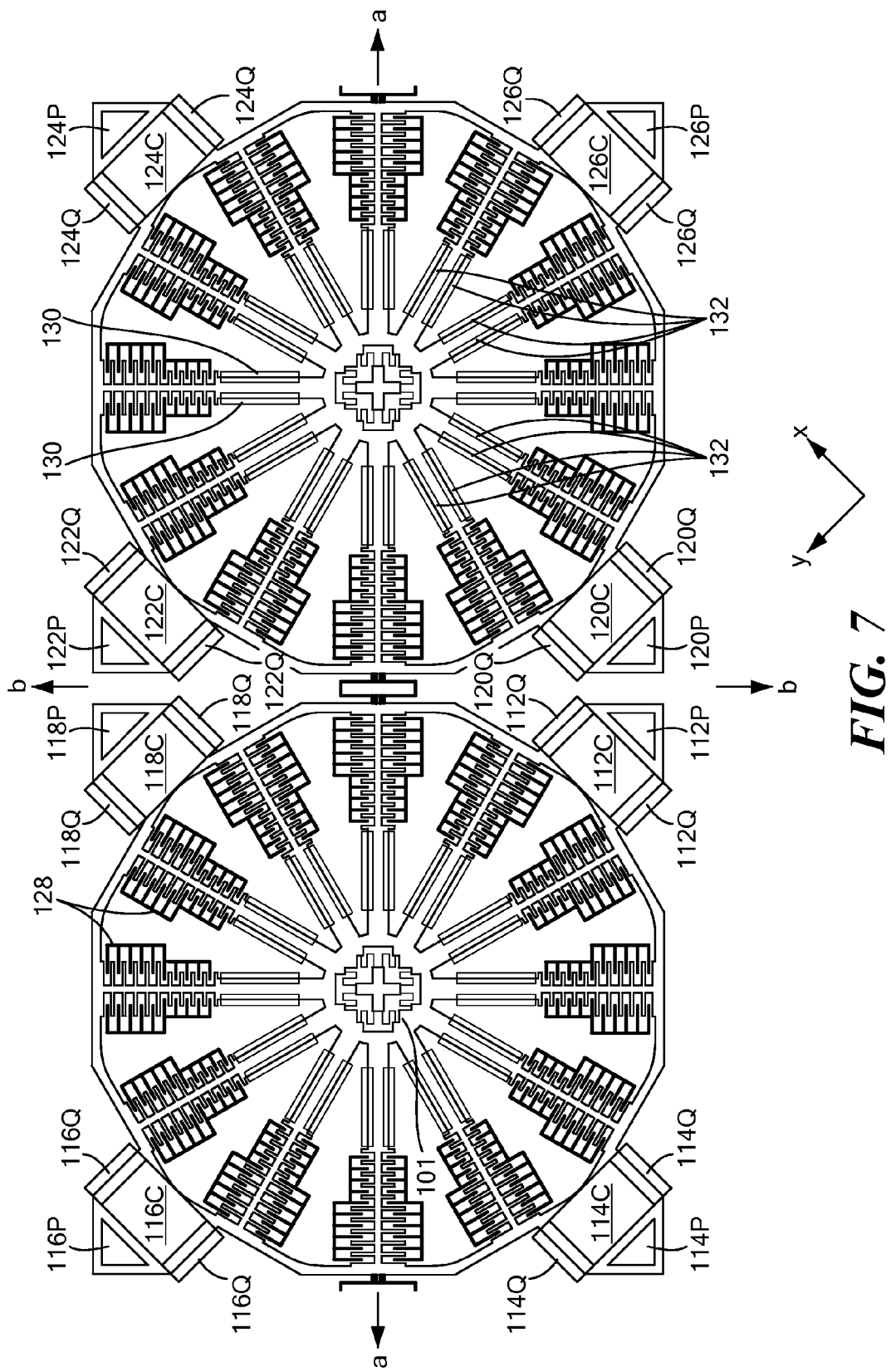

FIGS. 6 and 7 depict an exemplary gyroscope that may incorporate the systems of FIGS. 1-5. In particular, FIGS. 6 and 7 are schematic top-view diagrams of a vibratory X-Y axis gyroscope 100 in accordance with an exemplary embodiment of the present invention. This vibratory gyroscope operates generally as disclosed in Geen, U.S. Pat. No. 5,635,640, which is hereby incorporated herein by reference in its entirety. Specifically, this vibratory gyroscope includes various micromachined gyroscope structures in a device layer oriented above an underlying substrate having various substrate layer structures. For convenience, relevant gyroscope structures are described below with reference to axes labeled "a" and "b" in the device plane. The axes labeled "x" and "y" represent the axes about which Coriolis acceleration is sensed (i.e., the gyroscope sensing axes).

The gyroscope structures in the device plane include two rotationally-dithered masses (referred to hereinafter as shuttles) 102 and 104, each including an outer rim suspended via a number of spokes (in this case, twelve spokes, although different embodiments may use different numbers of spokes) from a central hub that is movably coupled to the substrate via a post (shaped like a "+") and suspension flexures 101 (for convenience, only one of the two post and suspension flexure arrangements is highlighted). The posts are affixed to the substrate, and the suspension flexures allow the shuttles to oscillate rotationally, with coupling flexure 106 and support flexures 108 and 110 helping to ensure that the shuttles oscillate in anti-phase with one another (i.e., shuttle 104 rotates counterclockwise when shuttle 102 is rotating clockwise, and vice versa) nominally within the device plane. For convenience, the dithered gyroscope structures in the device plane may be referred to collectively as a resonator.

Each of the spokes includes finger structures that interdigitate with corresponding comb structures affixed to the substrate (for convenience, only two of the twenty-four sets of combs are highlighted, with each set including two combs). In this exemplary embodiment, the twenty-four sets of combs are used for driving motion of the shuttles, where one comb in each pair is used for driving the shuttle in a clockwise direction and the other is used for driving the shuttle in a counterclockwise direction, specifically by applying alternating electrical signals to the combs to cause the shuttles 102 and 104 to oscillate through capacitive coupling with the finger structures of the spokes. Velocity sensing electrodes are used in a feedback loop to sense and control oscillation of the shuttles. In this exemplary embodiment, velocity sensing electrodes 130 on the substrate underlying the radial edges of the a-oriented and b-oriented spokes (i.e., four spokes of each shuttle) are used for velocity sensing (for convenience, only one of the eight pairs of velocity sensing electrodes is highlighted).

In this exemplary embodiment, each of the shuttles includes four protruding plates that overlie corresponding electrode arrangements on the substrate, with each electrode arrangement including a Coriolis-sensing electrode, a phase-compensating electrode, and a pair of quadrature electrodes on either side of the Coriolis-sensing and phase-compensating electrodes. Specifically, shuttle 102 includes plates 112, 114, 116, and 118 that respectively overlie arrangements (112C, 112P, 112Q), (114C, 114P, 114Q), (116C, 116P, 116Q), and (118C, 118P, 118Q), while shuttle 104 includes plates 120, 122, 124, and 126 that respectively overlie arrangements (120C, 120P, 120Q), (122C, 122P, 122Q), (124C, 124P, 124Q), and (126C, 126P, 126Q), where "C" designates the Coriolis-sensing electrode, "P" designates the phase-compensating electrode, and "Q" designates the quadrature electrodes. Each plate completely overlies the Coriolis-sensing and phase-compensating electrodes but only partially overlies the quadrature electrodes, such that capacitive coupling between the plate and each of the quadrature electrodes is dependent on the rotational position of the shuttle while capacitive coupling between the plate and the Coriolis-sensing and phase-compensating electrodes is substantially independent of the rotational position of the shuttle. In this exemplary embodiment, the plates are positioned so as to align with the x and y axes (i.e., at approximately 45 degree angles relative to the a and b axes). It should be noted that, in this exemplary embodiment, the Coriolis-sensing electrodes are not aligned with any of the drive combs 128. The various electrodes are discussed in more detail below.

While the shuttles are oscillating at their resonance frequency ($f_o$), driven via the drive combs 128 with feedback provided via the velocity sensing electrodes 130, out-of-plane movements of the gyroscope about the x and y axes cause the shuttles 102 and 104 to tip out-of-plane relative to the substrate through Coriolis forces, and these out-of-plane (i.e., Coriolis axis) movements of the shuttles are detected via the Coriolis-sensing electrodes through capacitive coupling with the plates. In this exemplary embodiment, such Coriolis forces are sensed in two axes by differential capacitance with respect to the Coriolis-sensing electrodes. For example, a rotation of the gyroscope about the x-axis can cause plates 114 and 124 to move toward their respective Coriolis-sensing electrodes while plates 118 and 120 move away from their respective Coriolis-sensing electrodes, and these movements are detected by changes in capacitance between each plate and its corresponding Coriolis-sensing electrode, with the signals obtained from the four Coriolis-sensing electrodes combined to provide a gyroscope output signal representing the movement of the gyroscope. Similarly, a rotation of the gyroscope about the y-axis can cause plates 116 and 126 to move toward their respective Coriolis-sensing electrodes while plates 112 and 122 move away from their respective Coriolis-sensing electrodes. It should be noted that the plates 112, 114, 116, 118, 120, 122, 124, and 126 fully overlay their respective Coriolis-sensing electrodes throughout the entire rotational range of motion of the shuttles so that signals obtained from the Coriolis-sensing electrodes are substantially independent of the rotational displacement of the shuttles.

Thus, the gyroscope resonator can be characterized by two modes, namely a shuttle resonance mode (i.e., the mode of the shuttles in the device plane) and an accelerometer resonance mode (i.e., the mode of the shuttles in the Coriolis axis). It is generally desirable for the two modes to match, as this tends to increase signal-to-noise ratio of the gyroscope. In embodiments of the present invention, the accelerometer resonance mode frequency is generally higher than the shuttle resonance mode frequency and the two modes are matched by effectively decreasing the accelerometer resonance mode frequency until it matches the shuttle resonance mode frequency, as discussed below.

Furthermore, even in the absence of any external movement of the gyroscope, oscillation of the shuttles typically results in slight out-of-plane movements of the shuttles, for example, due to imbalances in the shuttles and their respective support structures, and such out-of-plane movements of the shuttles can be misinterpreted as Coriolis signals and therefore represent error signals. As discussed above, such error signals may include an in-phase component and a quadrature component. While the quadrature error signals can be substantially greater than the phase error signals and therefore can swamp electronic circuitry that compensates for phase errors, it is generally desirable to remove both error components. In a gyroscope of the type shown in FIGS. 1 and 2, where the accelerometer resonance mode is out-of-plane with the shuttle resonance mode, it is generally impractical to use mechanical structures (e.g., levers and flexures) to eliminate the quadrature and in-phase error components.

Therefore, in a manner similar to that described by Clark in U.S. Pat. No. 5,992,233 or Geen in U.S. Pat. No. 7,032,451, each of which is hereby incorporated herein by reference in its entirety, quadrature adjustments are made by exerting a net torque on the shuttles in the Coriolis axis (i.e., out of the device plane). Quadrature suppression is also discussed in Lemkin, U.S. Pat. No. 7,051,590; in Chaumet, U.S. Patent Application Publication No. 2008/0282833; and in Saukoski, M., System and Circuit Design for a Capacitive MEMS Gyroscope, Doctoral Dissertation, TKK Dissertations 116, Helsinki University of Technology, Espoo, Finland (2008), each of which is hereby incorporated herein by reference in its entirety.

In the exemplary embodiment shown in FIGS. 6 and 7, quadrature adjusting electrodes on the substrate positioned under the edges of the plates (i.e., quadrature adjusting electrodes 112Q, 114Q, 116Q, 118Q, 120Q, 122Q, 124Q, and 126Q) as well as under the radial edges of the eight spokes of each shuttle positioned between the a-oriented and b-oriented spokes (i.e., quadrature adjusting electrodes 132; for convenience, only four of the sixteen pairs of quadrature adjusting electrodes 132 are highlighted) are used for making quadrature adjustments, although in alternative embodiments, similar quadrature adjustments can be made by applying bias voltages to the Coriolis sensing electrodes. A DC quadrature adjustment signal is applied to the quadrature adjusting electrodes so as to exert a net torque on the shuttles. Since the quadrature adjusting electrodes extend beyond the edges of the plates and spokes, the torque produced by the quadrature adjusting electrodes is proportional to the vibratory displacement of the shuttles in the device plane and is a function of the difference between the potentials of the electrodes. Thus, the torque causes a quadrature motion in the Coriolis axis (i.e., the axis normal to the device plane) that is modulated by the potential of the quadrature adjusting electrodes.

It should be noted that some of the combs may be used for velocity sensing in addition to, or in lieu of, separate velocity sensing electrodes. It also should be noted that the velocity sensing electrodes 130 and the quadrature adjusting electrodes are somewhat interchangeable; a particular pair of electrodes may be used for velocity sensing and/or quadrature adjustment as desired for a particular implementation.

In practice, in can be difficult to match the accelerometer resonance mode with the shuttle resonance mode, in part because the rotational frequency of the shuttles generally changes over time, for example, due to temperature changes and other factors.

Therefore, in embodiments of the present invention, a high-frequency test (carrier) signal is applied to the quadrature adjusting electrodes to induce accelerometer signals in the Coriolis channel that are 90 degrees phase shifted with respect to the Coriolis acceleration signal (i.e., the quadrature adjusting electrodes generate a quadrature output modulated by the input test signal), and the accelerometer resonance mode is adjusted by placing an appropriate biasing voltage on the gyroscope structures until there are no Coriolis channel signals at the test signal frequency. Thus, the test signal applied to the quadrature adjusting electrodes causes the quadrature motion of the shuttles to be amplitude modulated with the test frequency in the Coriolis axis. The test signal is provided at a frequency sufficiently above the gyroscope response frequency, so that the test signal is not detected by the signal filtering in the Coriolis channel and therefore does not affect the gyroscope output, but at a frequency sufficiently below the accelerometer resonance mode frequency, so that the Coriolis accelerometer will respond to the test signals. For example, in an exemplary embodiment, the gyroscope response frequency may be below approximately 32 Hz, and the shuttle resonance mode frequency ($f_o$) may be approximately 64 KHz, and the test signal frequency may be an integer fraction of the shuttle resonance mode frequency, e.g., between approximately 1 KHz to 8 KHz (i.e., $f_o/64$ to $f_o/8$). Furthermore, the test signal preferably averages to zero over time and therefore may be provided so that it alternately perturbs the shuttles in one direction for half the time and in the other direction for half the time. The test signal effectively modulates the motion of the shuttles in the Coriolis axis, so the induced accelerometer signals are a product of the test signal with the motion of the shuttles.

When the modes are exactly matched, the test signal component of the Coriolis channel signals is output as just phase and the Coriolis signal is output as quadrature. When the modes are not exactly matched, however, some of the test signal shows up in the Coriolis channel signals as quadrature (i.e., there will be an out-of-phase component that is used to produce the bias signal applied to the shuttles). In order to separate the signal components, the Coriolis signal is demodulated against quadrature and the quadrature signal is demodulated against phase, as described in greater detail below.

If necessary or desirable for a particular embodiment, the average voltage on the quadrature adjusting electrodes may be adjusted independently of the test signal, for example, by a quadrature nulling servo with bandwidth much smaller than the test signal frequency. Thus, the effective quadrature output can be as near zero as is needed for accuracy while leaving a modulated quadrature signal for use in the mode frequency matching servo. That modulated signal can be demodulated against a product of the test signal with a shuttle frequency signal to give the desired servo error term. In embodiments that employ a digital demodulator (synchronous rectifier), this product can be formed, for example, by forming an exclusive-or of the test and shuttle signals or by successive demodulation with those individual signals. There could be a residual ripple with zero mean at a harmonic of the test-signal frequency even when the frequency servo is locked, although this should not disturb the Coriolis signal if the test signal frequency is placed beyond the pass band of the Coriolis output smoothing filter, as discussed more fully below.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of compensating a gyroscope for bandwidth sensitivity, the method comprising:
   generating a test signal;
   generating a quadrature error signal using a received Coriolis sense signal;
   detecting a phase difference between the quadrature error signal and the test signal;
   determining a bandwidth of the gyroscope based on the detected phase difference; and
   compensating the gyroscope for bandwidth sensitivity by using the Coriolis sense signal and the bandwidth of the gyroscope.

2. The method of claim 1, wherein determining the bandwidth of the gyroscope comprises:
   determining a time constant $\tau$ of the gyroscope and determining the bandwidth based on the time constant $\tau$.

3. The method of claim 1, wherein determining the bandwidth of the gyroscope comprises adjusting a frequency of the test signal until the phase difference is equal to a predetermined value.

4. The method of claim 3, wherein adjusting the frequency of the test signal comprises:
   adjusting the frequency of the test signal until the phase difference is equal to 45 degrees.

5. The method of claim 1, wherein detecting the phase difference between the quadrature error signal and the test signal comprises:
   demodulating the quadrature error signal with the test signal;
   determining a direct current (DC) component of the demodulated quadrature error signal; and
   detecting the phase difference based on the DC component.

6. The method of claim 5, wherein determining the bandwidth of the gyroscope comprises:
   adjusting a frequency of the test signal until the direct current (DC) component of the demodulated quadrature error signal is zero (0).

7. The method of claim 1, wherein detecting the phase difference between the quadrature error signal and the test signal comprises:
   demodulating the quadrature error signal with the test signal;
   determining an alternating current (AC) component of the demodulated quadrature error signal; and
   detecting the phase difference based on the AC component.

8. The method of claim 1,
   wherein generating the test signal comprises generating a dither signal, and
   wherein detecting the phase difference between the quadrature error signal and the test signal comprises detecting a phase difference between the quadrature error signal and the dither signal.

9. The method of claim 1, wherein generating the quadrature error signal using the received Coriolis sense signal comprises demodulating the Coriolis sense signal with a quadrature reference signal generated by the gyroscope.

10. The method of claim 1, wherein compensating the gyroscope for bandwidth sensitivity by using the Coriolis sense signal and the bandwidth of the gyroscope comprises:
    generating a rate signal by demodulating the Coriolis sense signal with an in-phase reference signal generated by a resonator of the gyroscope; and
    multiplying the rate signal by a value indicative of the bandwidth of the gyroscope.

11. An apparatus for compensating a gyroscope for bandwidth sensitivity, the apparatus comprising:
    the gyroscope; and
    circuitry including:
      a test signal generator configured to generate a test signal;
      a phase difference detector configured to detect a phase difference between the test signal and a quadrature error signal generated using a Coriolis sense signal obtained from the gyroscope,
      a sensitivity gauge configured to determine a bandwidth of the gyroscope based on the phase difference; and
      a compensating circuit configured to compensate the gyroscope for bandwidth sensitivity by using the Coriolis sense signal and the determined bandwidth of the gyroscope.

12. The apparatus of claim 11, wherein the phase difference detector is configured to detect the phase difference at least in part by demodulating the quadrature error signal with the test signal.

13. The apparatus of claim 11, wherein the test signal generator is configured to adjust a frequency of the test signal until the quadrature error signal and the test signal are 45 degrees out of phase.

14. The apparatus of claim 11, wherein the test signal generator is configured to adjust a frequency of the test signal until a direct current (DC) component of the phase difference is zero (0).

15. The apparatus of claim 11, wherein the sensitivity gauge comprises a proportional-integrator (PI) controller.

16. The apparatus of claim 11, wherein the test signal generator comprises a voltage-controlled oscillator (VCO).

17. An apparatus, comprising:
    a gyroscope; and
    circuitry coupled to the gyroscope, the circuitry comprising:
      a phase difference detector coupled to an output of the gyroscope;
      an oscillator;
      a bandwidth detector coupled to an output of the oscillator and an output of the phase difference detector; and
      a compensating circuit coupled to the output of the gyroscope and to an output of the bandwidth detector.

18. The apparatus of claim 17, wherein the oscillator comprises a voltage-controlled oscillator (VCO).

19. The apparatus of claim 17, wherein the bandwidth detector comprises a proportional-integrator (PI) controller.

20. The apparatus of claim 17, wherein the compensating circuit comprises a multiplying unit.

* * * * *